(12) United States Patent
Wang et al.

(10) Patent No.: US 10,031,591 B2
(45) Date of Patent: Jul. 24, 2018

(54) POINTING DEVICE BRACKET ASSEMBLY AND SYSTEM

(71) Applicant: CONTOUR DESIGN, INC., Windham, NH (US)

(72) Inventors: Steven Wang, Windham, NH (US); HanNing Lu, Guangdong (CN); ChangJun Zhao, Henan (CN); ZhiJian Huang, Guangdong (CN)

(73) Assignee: CONTOUR DESIGN, INC., Windham, NH (US)

( * ) Notice: Subject to any disclaimer, the term of this patent is extended or adjusted under 35 U.S.C. 154(b) by 58 days.

(21) Appl. No.: 14/896,800

(22) PCT Filed: May 8, 2015

(86) PCT No.: PCT/CN2015/078625
§ 371 (c)(1),
(2) Date: Dec. 8, 2015

(87) PCT Pub. No.: WO2016/179768
PCT Pub. Date: Nov. 17, 2016

(65) Prior Publication Data
US 2017/0115751 A1   Apr. 27, 2017

(51) Int. Cl.
*G06F 3/033*   (2013.01)
*G09G 5/00*   (2006.01)
(Continued)

(52) U.S. Cl.
CPC .......... *G06F 3/0362* (2013.01); *G06F 3/0304* (2013.01); *G06F 3/038* (2013.01); *G06F 3/0338* (2013.01); *G06F 2203/0384* (2013.01)

(58) Field of Classification Search
CPC .... G06F 3/0304; G06F 3/0338; G06F 3/0354; G06F 3/03548; G06F 3/0362; H01H 2019/146
See application file for complete search history.

(56) References Cited

U.S. PATENT DOCUMENTS

| 4,543,571 A | 9/1985 | Bilbrey et al. |
| 4,544,915 A | 10/1985 | Wieme et al. |

(Continued)

FOREIGN PATENT DOCUMENTS

| CN | 202110495 U | 1/2012 |
| CN | 202306462 U | 7/2012 |

(Continued)

OTHER PUBLICATIONS

Berger, Jennifer, "Rolling Away From Pain," Macworld, vol. 20, No. 9, Jun. 2003, 5 pages.

(Continued)

*Primary Examiner* — Insa Sadio
(74) *Attorney, Agent, or Firm* — Lando & Anastasi, LLP (57) ABSTRACT

According to one aspect, embodiments herein provide a pointing device system including an elongate base member, a sleeve disposed to fit over a portion of the elongate base member, the sleeve configured to rotate about the elongate base member in a first direction and slide about the elongate base member in a second direction substantially orthogonal to the first direction, a first support disposed at a first end of the elongate base member, a second support disposed at a distal second end of the elongate base member, and a plurality of support rails interposed between the first support and the second support, wherein the first support includes a first angular extension and the second support includes a second angular extension, the first angular extension and second angular extension configured to support depression of the elongate base member.

32 Claims, 9 Drawing Sheets

(51) Int. Cl.
*G06F 3/0362* (2013.01)
*G06F 3/0338* (2013.01)
*G06F 3/03* (2006.01)
*G06F 3/038* (2013.01)

(56) References Cited

U.S. PATENT DOCUMENTS

| | | |
|---|---|---|
| 4,692,756 A | 9/1987 | Clark |
| 4,712,101 A | 12/1987 | Culver |
| 4,724,715 A | 2/1988 | Culver |
| 4,799,049 A | 1/1989 | Avila |
| 4,928,093 A | 5/1990 | Rahman |
| 4,982,618 A | 1/1991 | Culver |
| 5,115,231 A | 5/1992 | Avila et al. |
| 5,126,723 A | 6/1992 | Long et al. |
| 5,164,712 A | 11/1992 | Niitsuma |
| 5,600,348 A | 2/1997 | Bartholow et al. |
| 5,635,926 A | 6/1997 | Li |
| 5,666,138 A | 9/1997 | Culver |
| 5,703,356 A | 12/1997 | Bidiville et al. |
| 5,818,427 A | 10/1998 | Stromberg |
| 6,018,334 A | 1/2000 | Eckerberg et al. |
| 6,020,877 A | 2/2000 | Smith |
| 6,040,977 A | 3/2000 | Hoffer |
| 6,046,728 A | 4/2000 | Hume et al. |
| 6,084,574 A | 7/2000 | Bidiville |
| 6,091,401 A | 7/2000 | Chen et al. |
| 6,300,938 B1 | 10/2001 | Culver |
| 6,337,680 B1 | 1/2002 | Hamaji |
| 7,215,320 B2 | 5/2007 | Takeuchi et al. |
| 7,973,767 B2 | 7/2011 | Pedrazzini et al. |
| 8,830,166 B2 | 9/2014 | Nien et al. |
| 9,086,743 B2 | 7/2015 | Wang et al. |
| 9,092,072 B2 | 7/2015 | Wang et al. |
| 9,317,123 B2 | 4/2016 | Provancher et al. |
| 9,430,064 B2 | 8/2016 | Wang et al. |
| 9,436,299 B2 | 9/2016 | Wang et al. |
| 9,477,322 B2 | 10/2016 | Noris et al. |
| 9,489,064 B2 | 11/2016 | Wang et al. |
| 2001/0019324 A1 | 9/2001 | Rosenberg |
| 2002/0126025 A1 | 9/2002 | Wang |
| 2007/0097073 A1 | 5/2007 | Takashima et al. |
| 2007/0113681 A1 | 5/2007 | Nishimura et al. |
| 2008/0278444 A1 | 11/2008 | Schelling et al. |
| 2009/0256817 A1 | 10/2009 | Perlin et al. |
| 2011/0018798 A1 | 1/2011 | Chiang |
| 2011/0037693 A1 | 2/2011 | Chiang |
| 2011/0038114 A1 | 2/2011 | Pance et al. |
| 2011/0134031 A1 | 6/2011 | Wang et al. |
| 2011/0141052 A1 | 6/2011 | Bernstein et al. |
| 2011/0199306 A1 | 8/2011 | Pan |
| 2012/0038674 A1 | 2/2012 | Stergiou et al. |
| 2012/0063114 A1* | 3/2012 | Pan ................. G06F 3/0362 361/809 |
| 2012/0162070 A1* | 6/2012 | Nien ................. G06F 3/0312 345/157 |
| 2012/0228111 A1 | 9/2012 | Peterson et al. |
| 2017/0052607 A1 | 2/2017 | Wang et al. |

FOREIGN PATENT DOCUMENTS

| | | |
|---|---|---|
| CN | 104240486 A | 12/2014 |
| DK | 201570565 A1 | 8/2015 |
| DK | 201570486 A1 | 11/2016 |
| EP | 0382350 A2 | 8/1990 |
| EP | 0992936 A2 | 4/2000 |
| EP | 2249232 A2 | 11/2010 |
| EP | 2485123 A1 | 8/2012 |
| JP | 2000047812 A | 2/2000 |
| JP | 2000132331 A | 5/2000 |
| JP | 2006023915 A | 1/2006 |
| SE | 1551082 A1 | 9/2015 |
| SE | 1551035 A1 | 12/2016 |
| TW | M364911 U | 9/2009 |
| TW | M414614 U | 10/2011 |
| TW | M422108 U | 2/2012 |
| WO | 200206943 A1 | 1/2002 |
| WO | 0243049 A1 | 5/2002 |
| WO | 2002043046 A1 | 5/2002 |
| WO | 2003038800 A1 | 5/2003 |
| WO | 2011070522 A2 | 6/2011 |
| WO | 2012032480 A1 | 3/2012 |
| WO | 2014122191 A1 | 8/2014 |

OTHER PUBLICATIONS

"Ergonomic Equipment Can Take Away the Strain in Everyday Tasks," New York Times, Late Edition (East Coat), Nov. 15, 2001, 2 pages.

"This Ain't No Palindrome," Call Center Magazine, vol. 16, No. 2, pp. 14-26, Feb. 2003.

"On a Roll," Call Center Magazine, vol. 15, No. 11, Nov. 2002, pp. 10-12.

Shaw, Keith, "Cool Tools: Products That Have Graced the Cool Tool's Lab . . . ," Network World, vol. 19, No. 6, Feb. 11, 2002, p. 30.

Shaw, Keith, "Cool tools," Network World, vol. 18, No. 46, Nov. 12, 2001, p. 50.

"Spotlight Best Practices," Professional Safety, vol. 53, No. 7, Jul. 2008, 9 pages.

"product NEWS," ISHN vol. 43, No. 7, Jul. 2009, p. 43.

Search Report and Written Opinion by the Danish Patent and Trademark Office for application No. PA 2015 70486 dated May 27, 2016.

Akiba, Internet Site at http://akiba-pc.watch.impress.co.jp/hotline/991127/newitem.html, Nov. 27, 1999.

Firewoiks, NOMUS: All Hail the Mouse King, Internet Site at http://mattstow.com/, Jul. 1, 2008.

International Search Report for PCTCN2015078625 completed on Jan. 18, 2016 and dated Feb. 2, 2016.

PC Mag, Comfort and Support, Internet Site at http://www.pcmag.com/article2/0,2817,1190393,00.asp, Aug. 5, 2003.

Technical Data Sheet for part #HDNS-2000, Agilent Technologies, (2000).

Technical Data Sheet for part #HDNS-2100 and HDNS-2100 #001, Agilent Technologies, (Apr. 20, 2001).

Technical Data Sheet for part #HDNS-2200 and HDNS-2200 #001, Agilent Technologies, (2000).

Second Search Report and Written Opinion by the Danish Patent and Trademark Office for application No. PA 2015 70486 dated Dec. 6, 2016.

Search Report by the Swedish Patent and Registration Office for application No. 1551035-7 dated Feb. 1, 2017.

Third Search Report and Written Opinion by the Danish Patent and Trademark Office for application No. PA 2015 70486 dated Aug. 14, 2017.

* cited by examiner

POINTING DEVICE BRACKET ASSEMBLY AND SYSTEM

This application is a U.S. National Stage Application under 35 U.S.C. § 371 from International application No. PCT/CN2015/078625, filed May 8, 2015, which is hereby incorporated by reference in its entirety for all purposes.

FIELD OF THE INVENTION

The subject matter described herein relates generally to computer accessories, and, more particularly, to a pointing device system for controlling a computer interface.

BACKGROUND

In computer systems, a pointing device generally functions by detecting two-dimensional motion relative to its supporting surface. The pointing device may include various features, for example "wheels", which permit the user of the device to perform system-dependent operations. Other features, such as buttons add additional control or dimensional input. The motion of the pointing device typically translates into the motion of a pointer on a display, which allows for fine control of a Graphical User Interface (GUI). Typically these pointing devices utilize a "point and click" sequence of moving the cursor to the desired position and depressing a button to select an action. The computer mouse is probably the most known example of such a pointing device. Other known examples can include a trackball, a joystick and a touchpad.

As is understood, a computer mouse detects two-dimensional motion relative to its supporting surface. Physically, a mouse consists of an object held under one of the user's hands, with one or more buttons. A mouse may sometimes feature other elements, such as "wheels", which permit the user to perform various system-dependent operations, or extra buttons or features that can add more control or dimensional input.

A trackball is a pointing device consisting of a ball held by a socket containing sensors to detect a rotation of the ball about to axes; akin to an inverted mouse with an exposed protruding ball. The user rolls the ball with the thumb, fingers, or palm of the hand to move the cursor. Large tracker balls are common on graphical workstations for increase precision.

A joystick is an input device consisting of a stick that pivots on a base and reports its angle or direction to the device it is controlling. Joysticks are often used to control video games, and usually have one or more push-buttons whose state can also be read by the associated computer system.

A touchpad consists of a specialized surface that can translate the motion and position of a user's finger, hand, or touch, relative to movement of a cursor. Touchpads are common in laptop computers and conventionally used in environments where surface space is scarce. Touchpads may also be found in mobile phones, digital assistants, and portable media players.

Conventional pointing devices, as discussed above, suffer from a variety of deficiencies. In one such deficiency, conventional pointing devices require a predefined amount of surface space to operate the device. Furthermore, injuries or strains have resulted from positioning of the pointing device or the need to engage the arm, back, shoulders, neck, hands, and wrists to activate the pointing device.

SUMMARY OF THE INVENTION

Aspects and embodiments discussed herein are directed to a pointing device system that is controllable by a user without requiring unnecessary movements. In particular, various embodiments facilitate the elimination of harmful movements that may cause injuries or strains. In addition to minimizing strain on the arm, back, shoulders, neck, hands, and wrists as a result of the ergonomic design, aspects and embodiments of a pointing device as discussed herein improve the stability, structural integrity, and alignment of pointing devices. According to one aspect, provided is a pointing device system including an elongate base member, a sleeve disposed to fit over a portion of the elongate base member, the sleeve configured to rotate about the elongate base member in a first direction and slide about the elongate base member in a second direction substantially orthogonal to the first direction, a first support disposed at a first end of the elongate base member, a second support disposed at a distal second end of the elongate base member, and a plurality of support rails interposed between the first support and the second support, wherein the first support includes a first angular extension and the second support includes a second angular extension, the first angular extension and second angular extension configured to support depression of the elongate base member.

In one embodiment, the plurality of support rails are disposed substantially adjacent an outer surface of the sleeve. In an embodiment, the pointing device system includes a first fastener configured to retain the first angular extension at a first extended distance from the first support and a second fastener configured to retain the second angular extension at a second extended distance from the second support.

In one embodiment, the pointing device system includes a device housing configured to house at least a portion of the elongate base member and the first support and the second support, wherein the device housing includes a first pivot connected to a base of the device housing and a second pivot connected to the base of the device housing, the first pivot configured to receive the first angular extension and the second pivot configured to receive the second angular extension, wherein the first angular extension and the second angular extension are configured to pivot about the first and second pivot in response to a downward pressure being applied to the elongate base member relative to the base of the device housing. In an embodiment, the pointing device system of includes at least one force adjuster interposed between the base of the device housing and the elongate base member. In an embodiment, the at least one force adjuster is located proximate an end of the elongate base member. In an embodiment, the at least force adjuster is configurable to adjust a downward pressure force of the elongate base member. In an embodiment, the at least one force adjuster includes a leaf spring. In an embodiment, the pointing device system includes at least a first support spring interposed between the base of the device housing and the first support.

In one embodiment, the pointing device system includes a click trigger switch configured to activate and generate a click operation responsive to downward pressure being applied to the elongate base member. In an embodiment, the pointing device system includes at least one end sensor configured to detect translation of the sleeve beyond a predetermined location on the elongate base member in the second direction. In an embodiment, the at least one end sensor is chosen from an optical sensor, a Hall Effect sensor, and a capacitive sensor.

In one embodiment, the sleeve includes a tactile sleeve configured to conform to the shape of the elongate base member. In an embodiment, the first angular extension and the second angular extension include a substantially L-shaped rail.

In one embodiment, the pointing device system includes a navigation sensor supported by the plurality of support rails and aligned with the sleeve, wherein the navigation sensor is configured to detect rotational movement of the sleeve in the first direction and translation of the sleeve in the second direction. In an embodiment, the navigation sensor comprises an optical sensor configured to provide light to and detect reflected light from a surface of the sleeve. In an embodiment, the pointing device system includes a circuit board in communication with the navigation sensor, the circuit board configured to transmit data to a processor responsive to detected movement of the sleeve.

According to one aspect, provided is a pointing device system that includes a device housing, a bracket assembly including: an elongate base member, a sleeve disposed surrounding the elongate base member, the sleeve configured to rotate about the elongate base member in a first direction and slide about the elongate base member in a second direction substantially orthogonal to the first direction, a first support and a second support disposed at distal ends of the elongate base member having a plurality of support rails interposed therebetween, wherein the first support includes a first angular extension and the second support includes a second angular extension, the first and second angular extension configured to support depression of the bracket assembly relative to a base of the device housing, at least one navigation sensor configured to detect rotation and translation of the sleeve, and a circuit board disposed within the device housing, the circuit board in communication with the navigation sensor and configured to transmit data to a processor responsive to rotation and translation of the sleeve.

In one embodiment, the plurality of support rails are disposed substantially adjacent an outer surface of the sleeve. In an embodiment, the device housing includes a first pivot connected to the base of the device housing and a second pivot connected to the base of the device housing, the first pivot configured to receive the first angular extension and the second pivot configured to receive the second angular extension, wherein the first angular extension and the second angular extension are configured to pivot about the first and second pivot in response to a downward pressure being applied to the elongate base member relative to the base of the device housing.

In one embodiment, the pointing device system includes at least one force adjuster interposed between the base of the device housing and the bracket assembly. In an embodiment, the at least one force adjuster is located proximate an end of the elongate base member. In an embodiment, the at least force adjuster is configurable to adjust a downward pressure force of the elongate base member. In an embodiment, the at least one force adjuster includes a leaf spring disposed proximate an end of the elongate base member.

In one embodiment, the pointing device system includes at least a first support spring interposed between the base of the device housing and the first support. In an embodiment, the pointing device system includes a click trigger switch configured to activate and generate a click operation responsive to downward pressure being applied to the elongate base member.

In one embodiment, the pointing device system includes at least one end sensor configured to detect translation of the sleeve beyond a predetermined location on the elongate base member in the second direction. In an embodiment, the at least one end sensor is chosen from an optical sensor, a Hall Effect sensor, and a capacitive sensor.

In one embodiment, the first angular extension and the second angular extension include a substantially L-shaped rail. In an embodiment, the navigation sensor comprises an optical sensor configured to provide light to and detect reflected light from a surface of the sleeve.

In one aspect, provided is an apparatus that includes an elongate base member, a sleeve disposed to fit over a portion of the elongate base member, the sleeve configured to rotate about the elongate base member in a first direction and slide about the elongate base member in a second direction substantially orthogonal to the first direction, a first support including a first angular extension configured to support depression of the elongate base member, a second support including a second angular extension configured to support depression of the elongate base member, and at least one support rail interposed between the first support and the second support.

In one embodiment, the first support is disposed at a first end of the elongate base member and the second support is disposed at a second end of the elongate base member. In an embodiment, the at least one support rail includes a plurality of support rails.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

As discussed above, conventional pointing devices suffer from a variety of deficiencies, such as ergonomic problems. Often, operation of a conventional pointing device requires an unnecessary amount of open space or results in injury or strain to the user. Accordingly, aspects and embodiments discussed herein reduce the amount of space necessary to operate a pointing device, while minimizing strain on the arm, back, shoulders, neck, hands, or wrists, of the user. Various aspects and embodiments of a pointing device discussed herein have therefore been developed as a replacement for conventional computer mice.

Generally, various embodiments of the pointing device described herein include a rotatable sleeve disposed to fit over an elongate base member and accessible to a user. Typically the pointing device as disclosed herein is positioned below a keyboard. By rotating the sleeve around a central axis and sliding it along the central axis, the user of the pointing device may control the x and y coordinates of the cursor location in a GUI of a computer system to which the pointing device is connected. The elongate base member may be depressible by the user, permitting the user to perform actions corresponding to conventional mouse clicks. Furthermore, various embodiments of the pointing device discussed herein provide increased stability, structural integrity, and alignment.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
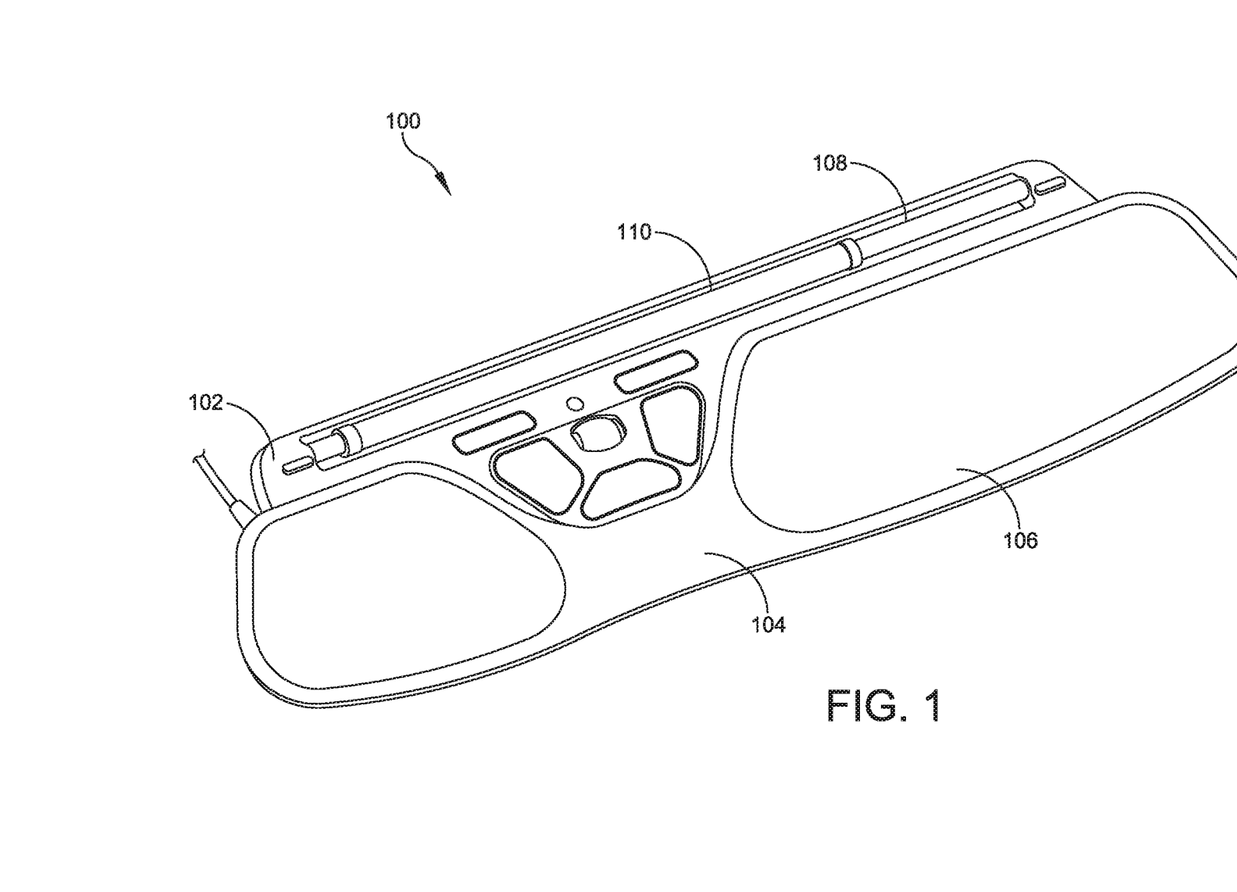
FIG. 1 is an example of a pointing device system according to aspects of the present invention.
Figure 2:
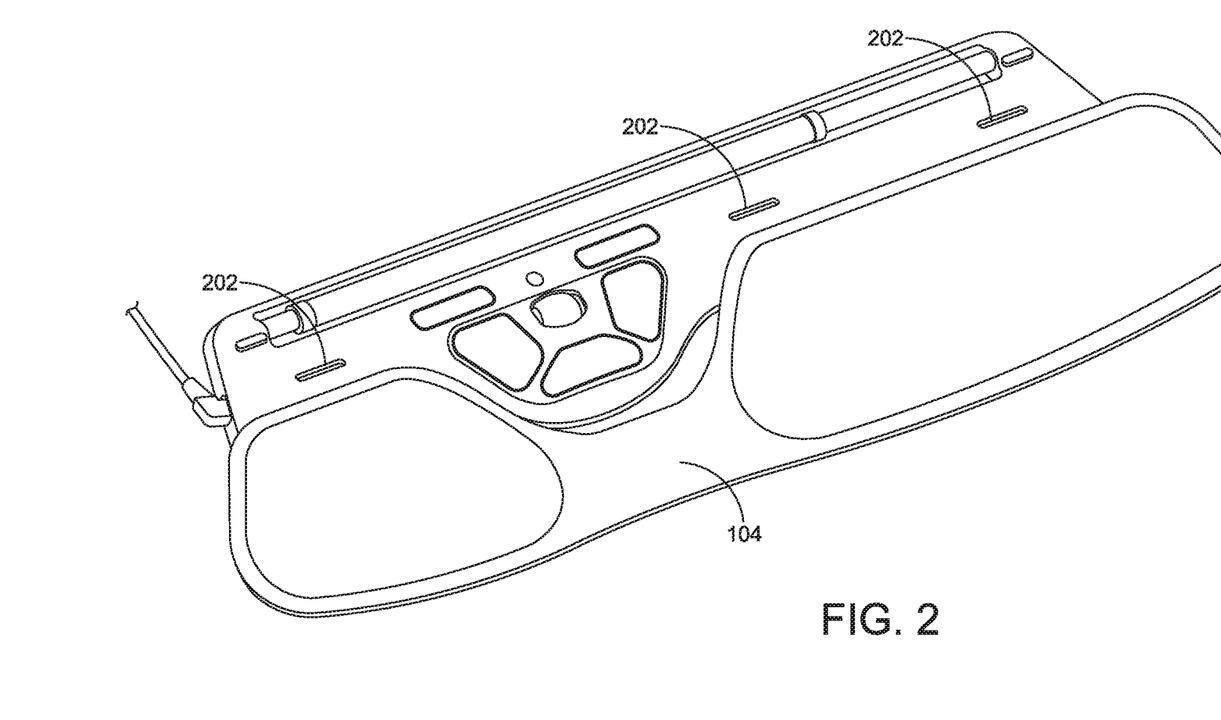
FIG. 2 is an additional depiction of the example embodiment of the pointing device system shown in FIG. 1.

Turning to FIG. 1, a first aspect of a pointing device system is shown. It is appreciated that various embodiments of the pointing device system, indicated generally by arrow 100, act as improved replacements for a conventional computer mouse. In one embodiment the pointing device 100 can include a device housing 102. The device housing 102 can also include and house additional parts and components as discussed below. For example, FIG. 1 shows a pointing device 100 having a device housing 102 including a removeable wrist rest 104. The wrist rest 104 may have one or more cushions 106 to improve wrist positioning of a user of the pointing device 100. FIG. 2 shows the wrist rest 104 removed from the device housing 102 and reattachable via one or more attachments 202, such as magnets. Returning to FIG. 1, in various embodiments the pointing device 100 may include a bracket assembly including an elongate base member 108 ("base member") and a sleeve 110 disposed to fit over a portion of the base member 108. As shown in the FIGS. discussed below, various embodiments of the bracket assembly may also include a first support at a first end of the base member 108, a second support at a second end of the base member 108, and a plurality of support rods interposed between the first support and the second support. The first support may additionally include a first angular extension, and the second support may additionally include a second angular extension. Both the first and second angular extensions are configured to support depression of the elongate base member 108. One or more switches included in the pointing device 100 are used to detect the depression of the elongate base member 108, when a user pushes down on the sleeve 110 to initiate an action referred to herein as a "click operation" or "mouse click". In various embodiments, the device housing 102 also includes a cover. The cover surrounds portions of the inner components of the device housing 102, such as hardware, and protects the components from dust, dirt, moisture, and etc.

As discussed herein, various embodiments may be in communication with a computer system, such as a computer. There are many examples of computer systems that are currently in use. These examples include, among others, network appliances, personal computers, workstations, mainframes, networked clients, servers, media servers, application servers, database servers, and web servers. Other examples of computer systems may include mobile computer systems (e.g., smart phones, tablet computers, laptop computers, and personal digital assistants) and network equipment (e.g., load balancers, routers, and switches). Examples of particular models of mobile computer systems include iPhones, iPads, and iPod touches running iOS operating system available from Apple, Android devices like Samsung Galaxy Series, LG Nexus, and Motorola Droid X, Blackberry devices available from Blackberry Limited, and Areas Phone devices.

The computer system of various embodiments may include a processor, a memory, an interconnection element, an interface, and data storage element. To implement at least some of the aspects, functions, and processes disclosed herein, the processor performs a series of instructions that result in manipulated data. The processor may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor is connected to other system components, including one or more memory devices, by the interconnection element.

The memory stores programs (e.g., sequences of instructions coded to be executable by the processor) and data during operation of the computer system. Thus, the memory may be a relatively high performance, volatile, random access memory such as a dynamic random access memory ("DRAM") or static memory ("SRAM"). However, the memory may include any device for storing data, such as a disk drive or other nonvolatile storage device.

Components of the computer system are coupled by an interconnection element. The interconnection element enables communications, including instructions and data, to be exchanged between system components of the computer system. The computer system also includes one or more interface devices such as input devices, output devices and combination input/output devices. Interface devices may receive input or provide output. More particularly, output devices may render information for external presentation. Input devices may accept information from external sources, such as various embodiments of the ergonomic pointing device described herein.

The data storage element includes a computer readable and writeable nonvolatile, or non-transitory, data storage medium in which instructions are stored that define a program or other object that is executed by the processor. The data storage element also may include information that is recorded, on or in, the medium, and that is processed by the processor during execution of the program.

Figure 3:
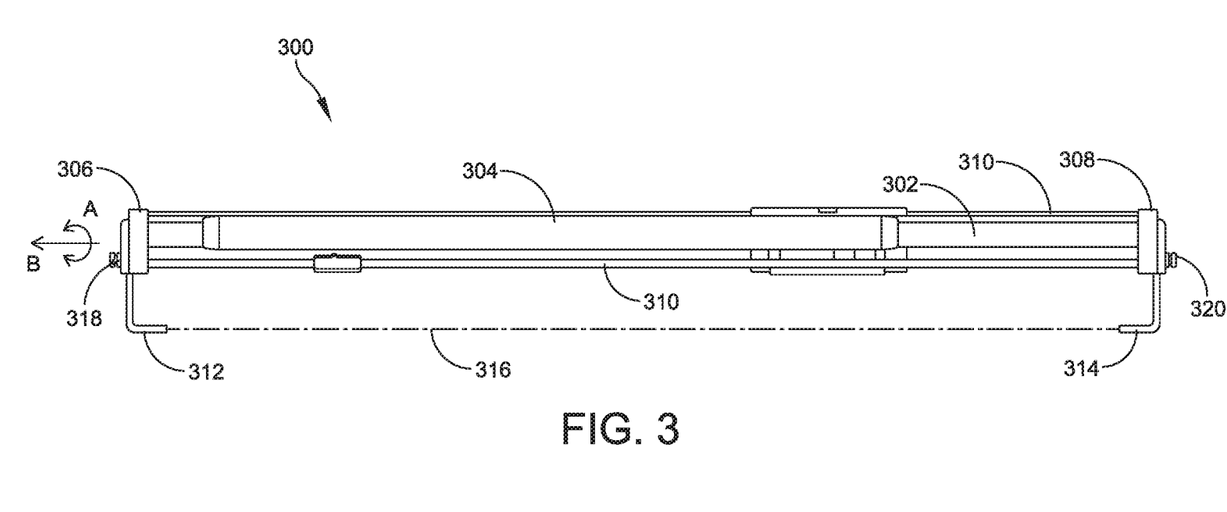
FIG. 3 is an example of a pointing device system bracket assembly according to aspects of the present invention.

Turning now to FIG. 3, with continuing reference to FIGS. 1-2, a bracket assembly, indicated generally by arrow 300, according to various embodiments is shown. FIG. 3 shows an elongate base member ("base member") 302 and a sleeve 304 disposed to fit over a portion of the base member 302. The sleeve 304 is configured to rotate about the base member 302 in a first direction and slide about the elongate base member 302 in a second direction substantially orthogonal to the first direction. For the purpose of illustration only, arrow indicator A represents the first direction and arrow indicator B represents the second direction. For example, in one embodiment the sleeve 304 and base member 302 may be coaxially arranged with respect to each other. By moving and rotating the sleeve 304 about the base member 302 the user may control the x and y coordinates of a cursor location in a GUI of the computer to which a pointing device is in communication with. Furthermore, in various embodiments, the base member 302 operations (discussed below).

In various embodiments, the sleeve 304 can include a tactile material disposed on the outside surface of the sleeve 304, such as a grip. The sleeve 304 may also be flexible and composed of one of plastic, cloth, paper, or other material. As shown, the sleeve 304 takes the shape of the elongate base member 302. In additional embodiments, the sleeve 304 may be composed of a rigid material. In further embodiments, the sleeve 304 may also include indicia printed thereon, and may be replaceable with a second sleeve by the user. While not depicted in FIG. 3, in various embodiments, the sleeve 304 is supported on the elongate base member 302 by one or more bushings that allow fluid rotation and sliding about the base member 302. Although the base member 302 and sleeve 304 are shown in FIG. 1-3 as including a generally tubular shape, in various additional embodiments, the base member 302 and sleeve 304 could include shapes having a generally circular cross-section; a cross-section having at least one flat surface and at least one curved surface; or a cross section having at least three rounded corners. The base member 302 may be composed of any durable material, such as aluminum. In various embodiments, the base member 302 is chosen to have a low coefficient of static friction between the base member 302 and sleeve 304 to provide fluid movement of the sleeve 304 about the base member 302.

FIG. 3 also shows a first support 306 and a second support 308 disposed at distal ends of the elongate base member 302. Each support is configured to receive the elongate base member 302, and suspend the elongate base member 302 and surrounding sleeve 304 to permit depression thereof. The bracket assembly 300 may also include a plurality of support rails 310 interposed between the first and second support (306 and 308). In various embodiments, the plurality of support rails 310 are disposed substantially adjacent an outer surface of the sleeve 304. In a further embodiment, the plurality of support rails 310 can include one or more flexible hollow rods. It is appreciated that flexible hollow rods add structural integrity to the bracket assembly 300, while decreasing the weight of the assembly. Furthermore, a bracket assembly 300 including more than one support rails 310, as shown in FIG. 3, increases the resistivity of the bracket assembly 300 to torques experienced by the base member 302 as a result of depressive forces. In various embodiments, the support rails 310 can be composed of a rigid material capable of withstanding depressive forces, such as aluminum.

In various embodiments, the first support 306 may include a first angular extension 312 and the second support 308 may include a second angular extension 314. Each angular extension (312 and 314) protrudes from the respective support (306 and 308). As discussed above, the first angular extension 312 and second angular extension 314 are configured to support depression of the elongate base member 302. In one embodiment, and as shown in FIG. 3, the first and second angular extension (312 and 314) may each include a substantially "L" shaped rail; however, in further implementations the first and second angular extension (312 and 314) may include a substantially square, triangular, circular or any other shaped rail, and in some particular implementations, may include a hinge. In various embodiments the first angular extension 312 and second angular extension 314 are substantially aligned on an axis of rotation (axis indicated as ghost line 316). Depression of the elongate base member 302 pivots the first and second angular extension about a point on the rotational axis 316. Each angular extension (312 and 314) may additionally be composed of a solid or hollow rail. In further embodiments, the bracket assembly 300 may include one or more fasteners configured to retain the angular extension (312 and 314) at a distance from the respective support (306 and 308). For example, FIG. 3 shows a first fastener 318 configured to retain the first angular extension 312 at a first extended distance from the first support 306 and a second fastener 320 configured to retain the second angular extension 314 at a second extended distance from the second support 308. The fasteners (318 and 320) may include a screw, a threaded bolt, or any other locking mechanism capable of holding the position of the angular extension relative to the respective support. Accordingly, the fasteners permit the angular extensions to be moved, positioned, or otherwise situated during manufacturing or operation of the pointing device in which the bracket assembly 300 is installed. Extension or retraction of the angular extension (312 or 314) results in a corresponding movement of the axis of rotation 316 and may assist in calibration or alignment of the pointing device. Accordingly, various embodiments of the bracket assembly discussed herein increase the structural integrity and stability of the associated pointing device.

Figure 4:
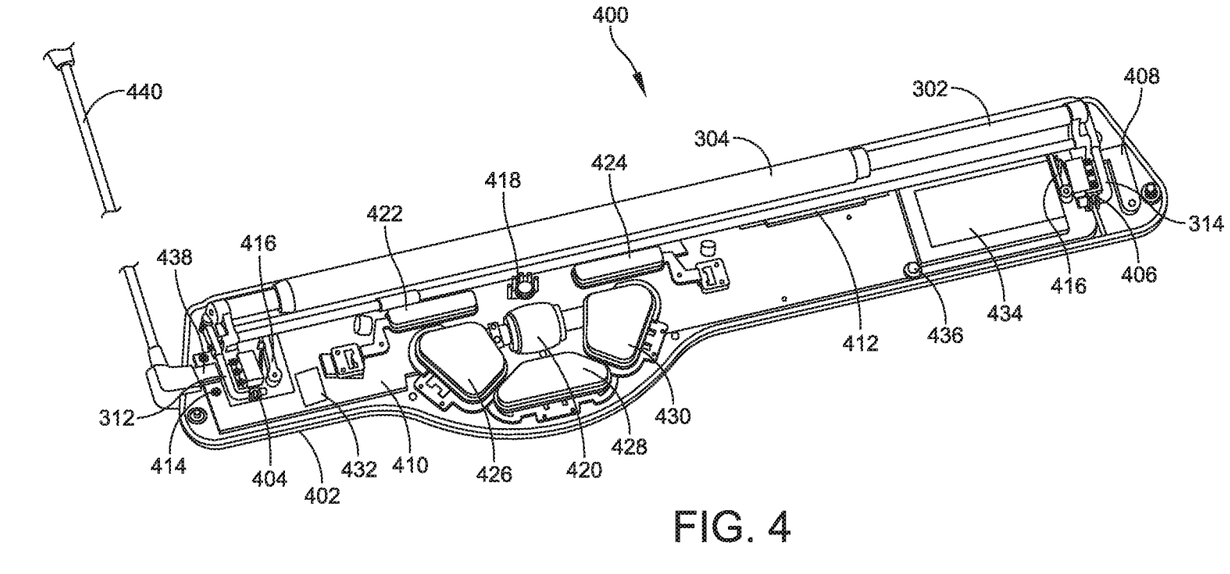
FIG. 4 illustrates a transparent view of an example of a pointing device system according to aspects of the present invention.

Turning now to FIG. 4, a transparent view of a pointing device system according to various embodiments is shown. The pointing device system is indicated generally by arrow 400. As shown in FIG. 1 and FIG. 2, in various embodiments, the pointing device 400 may include a device housing defined by a device base 402, the bottom side of which is adapted to be placed on a suitable workspace surface, such as a desktop surface. The device housing may also include a top enclosure (not shown). In various other embodiments, the device housing may also be defined by the device base 402 and a device cover (not shown). The device housing is configured to receive, in recess, the elongate base member 302, the sleeve 304, and associated bracket assembly 300 (discussed above with reference to FIG. 3). As shown, the device housing partially exposes the sleeve 304 and elongate base member 302 so as to make them accessible to the user.

In various embodiments the device housing includes a first pivot 404 connected to the base 402 of the device housing and a second pivot 406 connected to the base 402 of the device housing. The first pivot 404 may be configured to receive the first angular extension 312 and the second pivot 406 may be configured to receive the second angular extension 314. Accordingly, the first angular extension 312 and the second angular extension 314 are configured to pivot about the first pivot 404 and second pivot 406 in response to a downward pressure being applied to the elongate base member 302 relative to the base of the device housing (i.e. device base 402). In various embodiments, the first and the second pivot (402 and 404) are substantially aligned so as to substantially align rotation of the first angular extension 312 and second angular extension 314 along the axis of rotation 316. As discussed in further detail below, such a downward pressure can be used to initiate a click operation.

Figure 5:
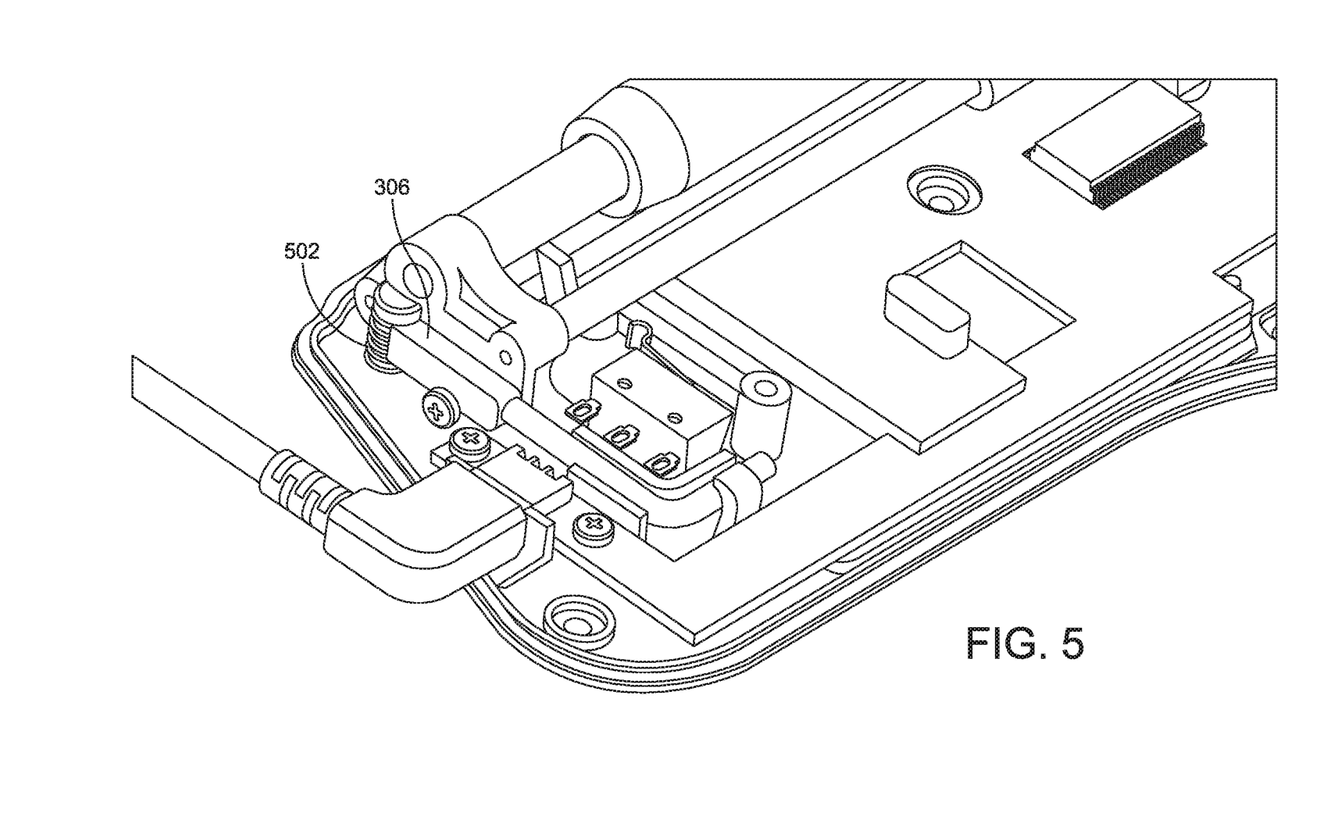
FIG. 5 illustrates an enhanced view of the example pointing device system depicted in FIG. 4.

Turning briefly to FIG. 5, an enhanced view of the pointing device 400 discussed with reference to FIG. 4 is shown. In various embodiments, the pointing device 400 may further include at least one support spring interposed between the device base 402 and a support. This may include a first support spring 502 interposed between the device base 402 and the first support 306 and a second support spring (not shown) interposed between the device base 402 and the second support 308. Each respective support spring provides a resistive upward force to depression of the elongate base member 302. The support springs bias the elongate base member 302 away from the base of the device housing (i.e. device base 402), resulting in a gap therebetween. The gap allows the elongate base member 302 to be depressed to activate one or more switches, such as a click trigger switch. While not shown in FIG. 5, the second support spring is aligned and arranged in a similar fashion to the first support spring 502 and first support 306.

Turning back to FIG. 4, the device housing may also house a force adjuster 408 interposed between the device base 402 and the first and/or second angular extension (312 and 314). The force adjuster 408 is configurable to adjust a downward pressure force of the elongate base member 302. In one embodiment, the force adjuster 408 is located proximate an end of the elongate base member 302 and interposed between the base of the device housing (device base 402) and the first angular extension 312. However, in various other embodiments as illustrated in FIG. 4, the force adjuster 408 may be interposed between the base of the device housing (i.e. device base 402) and the second angular extension 314. It is also appreciated that a respective force adjuster may be interposed between the base of the device housing (i.e. device base 402) and both the first angular extension 312 and the second angular extension 314.

Figure 6:
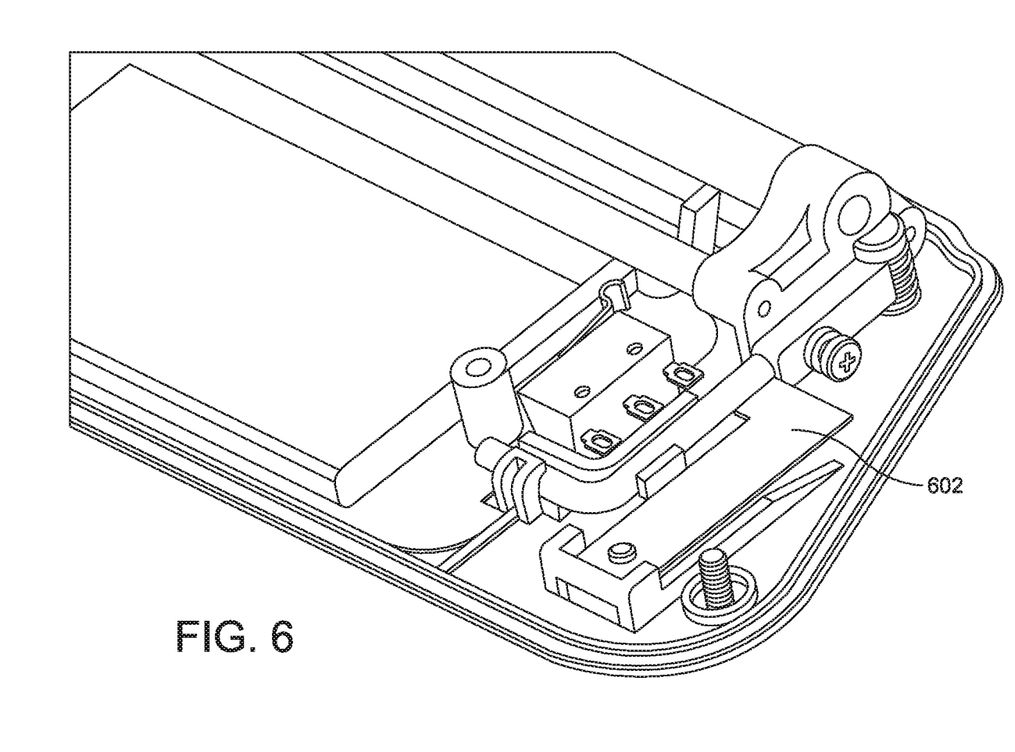
FIG. 6 illustrates an additional enhanced view of the example pointing device system depicted in FIG. 4.
Figure 7:
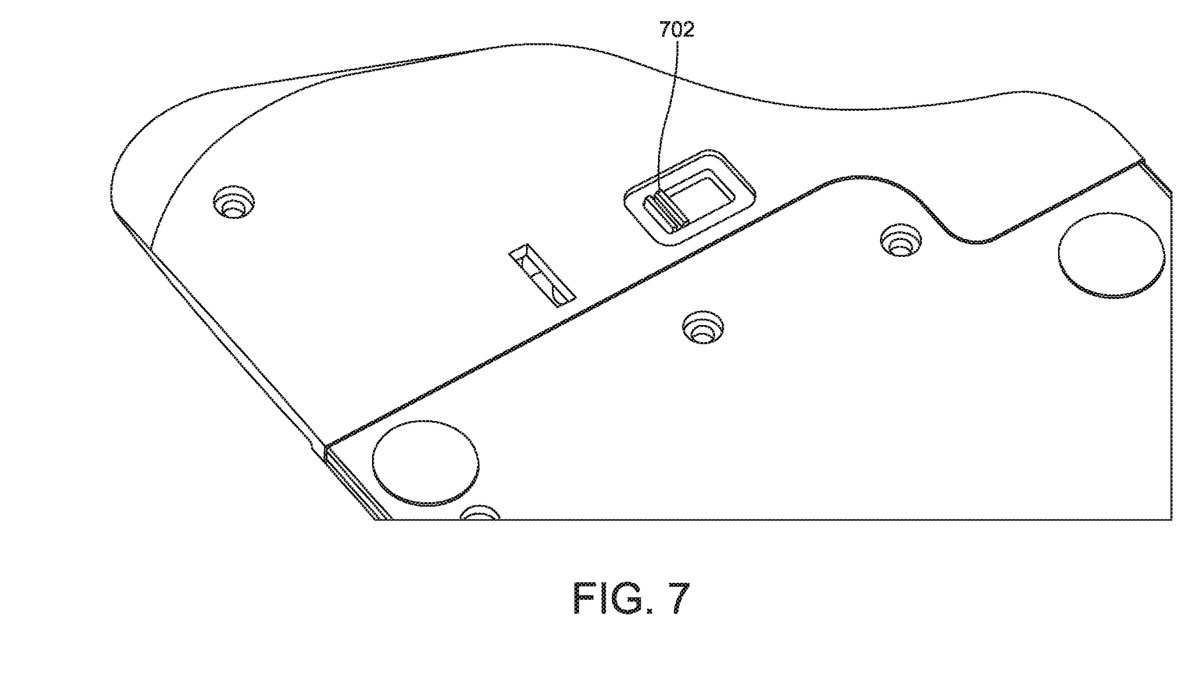
FIG. 7 illustrates a bottom-view of the example pointing device system depicted in FIG. 4.

Turning briefly to FIG. 6, in various embodiments, the force adjuster 408 includes an adjustable leaf spring 602. The leaf spring 602 is laterally placed relative to the first and/or second angular extension (312 and 314) and applies an upward pressure on the first or second angular extension (312 and 314). A fulcrum below the leaf spring 602 is moveable by the user of the pointing device 400 to select the amount of depressive force required to generate the click operation. FIG. 7 shows the underside of the device base 402, wherein an adjustable fulcrum 702 is accessible to the user.

Returning to FIG. 4, various embodiments of the pointing device 400 may include a circuit board 410 in communication with the one or more navigation sensors 412. In various embodiments, the circuit board 410 may be configured to transmit data to a processor responsive to detected movement of the sleeve 304. For example, the circuit board 410 can be configured to transmit data relating to movement of the sleeve about the base member 302 to the computer system. Various components of the pointing device 400 are mounted to either a single common printed circuit board, or distributed among more than one printed circuit board. For example, components mounted to a main circuit board can be in electrical communication with components mounted to a secondary circuit board, via wiring connecting the main and secondary circuit board. The circuit board 410 is secured to the device housing with one or more retainers (shown as screws 414).

In various embodiments, the device housing may also house one or more navigation sensors 412 in electrical communication with the circuit board 410 and aligned with the sleeve 304. The one or more navigation sensors 412 are configured to detect rotational movement of the sleeve 304 and translation of the sleeve 304 about the elongate base member 304. For example, a navigation sensor 412 may include an optical sensor configured to provide light to and detect reflected light from a surface of the sleeve 304. Movement of the sleeve 304 varies reflection of the light and enables the navigation sensor 412 to detect movement. Although described in one embodiment as including an optical sensor, in various embodiments the navigation sensor 412 may include any laser sensor capable of detecting movement of the sleeve 304.

Figure 8:
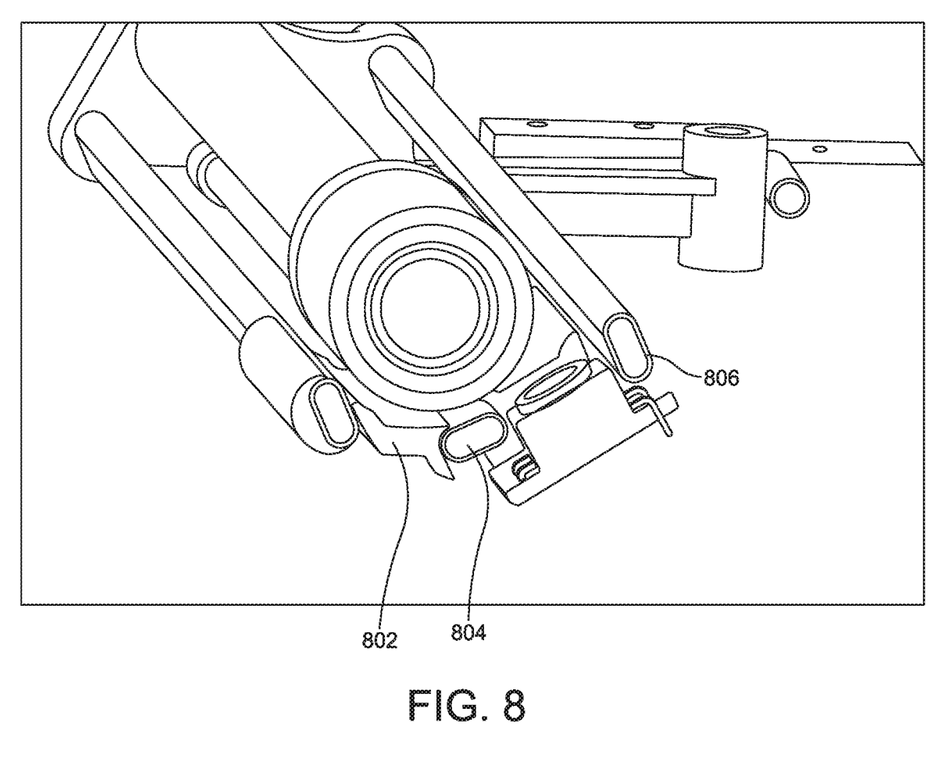
FIG. 8 is an additional example of a bracket assembly according to aspects of the present invention.

In various embodiments, the navigation sensor 412 is disposed on one or more of the plurality of support rails. FIG. 8 demonstrates such a configuration. FIG. 8 shows the one or more navigation sensors 412 (not illustrated) housed and suspended at a fixed location via a sensor board 802 extending between a first support rail 804 and a second support rail 806. As shown in FIG. 8, the navigation sensor board 802 may be disposed in a plane angular to the sleeve 304. While shown in FIG. 8 as disposed external to the sleeve 304 and the base member 302, in alternative embodiments the navigation sensor 412 may be disposed in the elongate base member 302 and internal to the sleeve 304 such as disclosed in U.S. patent application Ser. Nos. 14/460,267, titled "INNER-SENSOR BASED POINTING DEVICE", and 14/460,303, titled "INNER-SENSOR BASED POINTING DEVICE", and U.S. Pat. No. 8,823,644, titled "INNER-SENSOR BASED POINTING DEVICE", each of which is herein incorporated by reference in its entirety. In such an embodiment, the elongate base member 302 defines at least one aperture through which the navigation sensor 412 can detect movement of the sleeve 304 with respect to the elongate base member 302.

Returning to FIG. 4, in various embodiments, the device housing may further house at least one end sensor 416 configured to detect translation of the sleeve 304 beyond a predetermined location on the elongate base member 304. The end sensor 416 may be positioned distally near or at the end of the base member 304. In some embodiments the at least one end sensor 416 includes a microswitch that is actuated by movement of the sleeve 304 to near the end of elongate base member. However, the at least one sensor 416 may also include an optical sensor, a Hall Effect sensor, or a capacitive sensor. According to some embodiments, the pointing device is configured so that before the end sensor 416 detects movement of the sleeve to actuate the end sensor 416, a given amount of sleeve movement correlates to a given amount of pointer movement on a display of the computer system. The pointing device is also configured so that once the end sensor 416 detects the actuation by the sleeve 304, a larger amount of pointer movement is provided for a same given amount of sleeve 304 movement. In further embodiments the device housing may include a first end sensor positioned at a first end of the elongate base member 302 and a second end sensor positioned at a second distal end of the elongate base member 302.

In one embodiment, the navigation sensor 412 in electrical communication with the circuit board 410 can be configured to provide a speed adjustment of the pointer on the display of the computer system with respect to movement of the sleeve 304 about the elongate base member 302 of the pointing device 400. Additionally, the pointing device 400 may include additional buttons permitting the user to configure a speed setting of the cursor. For example, FIG. 4 shows a cursor speed button 418. The cursor speed button 418 can be used to select between, for instance, five different cursor speeds. According to some embodiments, the cursor speed is a function of a resolution of the navigation sensor 412. The selected cursor speed is indicated by a corresponding number of LED indicators being lit or turned off, as the user repeatedly presses the cursor speed button 418 (indicators shown in FIG. 4). The numerical value of each cursor speed setting can be expressed in Dots Per Inch (DPI).

Figure 9:
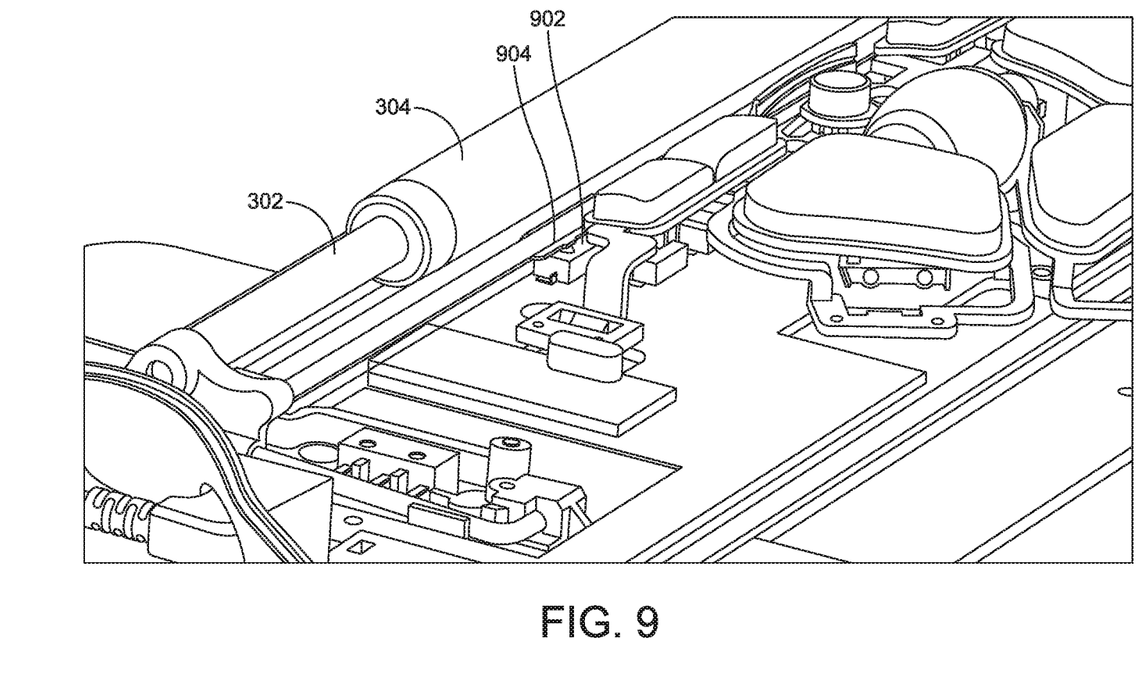
FIG. 9 illustrates an additional enhanced view of the example pointing device system depicted in FIG. 4.

Turning briefly to FIG. 9, an enhanced view of the pointing device system 400 is shown. In various embodiments, the device housing may also include one or more click trigger switches 902 disposed on and in communication with the circuit board 410. The click trigger switch 902 is configured to detect depression of the elongate base member 302. Downward pressure applied to the sleeve 304 by a user results in the click trigger registering a click operation similar to a left mouse click on conventional mouse devices. The downward pressure can be applied at any location on the sleeve 304, and at any location of the sleeve 304 on the elongate base member 302. In various embodiments the click trigger can be a mechanical switch that is actuated by the click trigger switch 902 and may be activated by one of the support rails 310 and the downward movement of the sleeve 304 and the elongate base member 302. In other embodiments, for example, the click trigger can include a proximity sensor, such as a Hall-effect device. The Halleffect sensor outputs a signal based on the proximity of an actuator to the sensor. For example the actuator can include a magnet. As the magnet increases in proximity to the sensor, the sensor will increase the output voltage. Once a predetermined threshold has been reached, a click operation is generated and activated. As shown in FIG. 9, the click trigger switch 902 may be activated by one of the support rails 310 or an actuator 904 positioned on an individual one of the support rails 310. In some embodiments, the click trigger 902 may also be used to provide an audio feedback (e.g., click sound) to the user to indicate a primary click operation has occurred. The click operation may be used, for example, to select an item in the GUI of the computer system interface or perform a drag and drop operation with the pointing device 400. It is to be appreciated that other kinds of sensor technologies, including but not limited to optical or capacitive technologies, may be used in other embodiments, for detecting the depression of the elongate base member 302.

Returning to FIG. 4, in various embodiments the device housing can house a plurality of buttons or button sets. Similar to the components discussed above, the plurality of buttons or button sets may be disposed on and in communication with the circuit board 410. Depression of any one of the plurality of button or buttons sets permits the user to perform a function generally performed by a conventional mouse. For example, FIG. 4 shows the device housing as including a scroll wheel 420, a copy button 422, a paste button 424, a left click button 426, a double click button 428, and a right click button 430. In particular, the scroll wheel 420 permits the user of the pointing device to perform scrolling actions on information presented in the computer user interface by rotating the scroll wheel 420 up or down. The additional buttons shown represent common mouse-related and other user interface-related actions. For example, in various in embodiments, as noted above, the buttons represent actions including Copy, Paste, Right click, Left click, or Double click. Similar to the click trigger switch 902, each respective button has a corresponding switch configured to register activation of the button. Each switch may additionally provide audio feedback (e.g., a click sound) to indicate to the user that the corresponding operation has occurred. It is to be understood that the plurality of buttons 422-430 are programmable in combination with the circuit board 410 including a microprocessor stored thereon. It is also to be understood that while described above as individually configured to perform Copy, Paste, Right click, Left click, or Double click functions, in various further embodiments, the plurality of buttons shown in FIG. 4 can be configurable by the user to perform a user defined function. For example, the user may select which individual button of the plurality performs a Copy operation, or instruct the individual button to perform a specialized function (e.g., activate screen saver). Absent instruction by the user, various buttons of the plurality of buttons may be configured to perform a default function (e.g., Copy, Paste, Right click, Left click, or Double click), as described above.

As discussed above, various embodiments of the pointing device 400 may be configured to communicate with a computer system, or similar device, and translate the motion of the sleeve 304 relative to the elongate base member 302 into motion of a pointer on the display of the computer system, which allows for fine control of a GUI. For example, communication may include communication through a wired connection, such as a cable 440. However, in various additional embodiments, the pointing device 400 is characterized by the absence of a wired connection to the corresponding computer system. Generally, the absence of wires connecting the pointing device 400 and computer system further improves the ergonomics of the pointing device 400 and removes obstructions from the workspace of the user. Accordingly, in one embodiment the circuit board 410 further includes a transmitter circuit 432 including a wireless transmitter/receiver for wireless communication with a wireless transmitter/receiver at the computer system. For example, the transmitter can include a radio frequency (RF) transmitter, which can for example be in the form of a USB type device that can be connected to a USB port. A processor is electrically connected to, or otherwise associated with, the transmitter, and causes transmission of data regarding the detected rotations and translations of the sleeve 304. Transmitted motion of the sleeve 304 is translated by computer interface circuitry to cursor control signals for the computer system. The transmitter encodes and transmits information including movement of the sleeve 304 about the base member 302, click operations, and button activation. The receiver is configured to accept the transmission and responsively decode the information. In various embodiments, the receiver is configured to plug-in to a peripheral mouse input of the computer system. To minimize interference, the transmitter and receiver of one embodiment may be configured to operate at a frequency of 2.4 Ghz. It is also appreciated that various embodiments may use BLUETOOTH® RF technology to communicate between the pointing device and the computer system. As used herein, BLUETOOTH® refers to a short range ad hock network, otherwise known as piconet.

The pointing device 400 may also include a rechargeable power source 434. In various embodiments, the rechargeable power source 434 includes a rechargeable battery. The power source 434 is in electrical communication with and configured to provide electrical power to components disposed on the circuit board 410. For example, the rechargeable power source 434 of one embodiment may include a rechargeable lithium-ion (LiOn) battery. As shown in FIG. 4, the rechargeable power source 434 of one embodiment is retained and coupled to the circuit board 410 by one or more retainers 436. Retainers 436 permit the user of the pointing device 400 to remove and replace the rechargeable power source 434 of one embodiment.

With continuing reference to FIG. 4, in various embodiments, the device housing further houses a universal serial bus (USB) circuit 438 configured to supply power provided by a USB cable 440 to the rechargeable power source 434. In one embodiment, the USB circuit 438 is disposed on and in electrical communication with the circuit board 410. FIG. 4 shows a USB circuit 438 configured to receive a USB cable 440. In further embodiments, the pointing device can be configured to communicate with the computer system via the USB cable 400. For example, the pointing device may be configured to transmit information, such as detected sleeve 304 movement and click operations, to the computer system via the cable 440. Accordingly, the USB circuit 438 may be in selective communication with the circuit board 410 and various other system components. While FIG. 4 shows a USB cable 440 coupled with the USB circuit 438, in various embodiments, the USB cable 440 is removable and the pointing device 400 is configured to be free of all wired connections to the computer system.

Accordingly, aspects and embodiments discussed herein improve the stability, structural integrity, and alignment of the pointing device in addition to reducing injuries and strains resulting from use of conventional pointing devices.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A pointing device system, comprising:
   an elongate base member;
   a sleeve disposed to fit over a portion of the elongate base member, the sleeve configured to rotate about the elongate base member in a first direction and slide about the elongate base member in a second direction substantially orthogonal to the first direction;
   a first support disposed at a first end of the elongate base member;
   a second support disposed at a distal second end of the elongate base member; and
   a plurality of hollow rods interposed between the first support and the second support,
   wherein the first support includes a first angular extension and the second support includes a second angular extension, the first angular extension and second angular extension configured to support depression of the elongate base member.

2. The pointing device system of claim 1, wherein the plurality of hollow rods are disposed substantially adjacent and spaced apart from an outer surface of the sleeve.

3. The pointing device system of claim 1, further comprising a first fastener configured to retain the first angular extension at a first extended distance from the first support and a second fastener configured to retain the second angular extension at a second extended distance from the second support.

4. The pointing device system of claim 1, further comprising a device housing configured to house at least a portion of the elongate base member and the first support and the second support, wherein the device housing includes a first pivot connected to a base of the device housing and a second pivot connected to the base of the device housing, the first pivot configured to receive the first angular extension and the second pivot configured to receive the second angular extension, wherein the first angular extension and the second angular extension are configured to pivot about the first and second pivot in response to a downward pressure being applied to the elongate base member relative to the base of the device housing.

5. The pointing device system of claim 4, further comprising at least one force adjuster interposed between the base of the device housing and the elongate base member.

6. The pointing device system of claim 5, wherein the at least one force adjuster is located proximate an end of the elongate base member.

7. The pointing device system of claim 5, wherein the at least one force adjuster is configurable to adjust a downward pressure force of the elongate base member.

8. The pointing device system of claim 7, wherein the at least one force adjuster includes a leaf spring.

9. The pointing device system of claim 8, further comprising at least a first support spring interposed between the base of the device housing and the first support.

10. The pointing device system of claim 1, further comprising a click trigger switch configured to activate and generate a click operation responsive to downward pressure being applied to the elongate base member.

11. The pointing device system of claim 1, further comprising at least one end sensor configured to detect translation of the sleeve beyond a predetermined location on the elongate base member in the second direction.

12. The pointing device system of claim 11, wherein the at least one end sensor is chosen from an optical sensor, a Hall Effect sensor, and a capacitive sensor.

13. The pointing device system of claim 1, wherein the sleeve includes a tactile sleeve configured to conform to the shape of the elongate base member.

14. The pointing device system of claim 1, wherein the first angular extension and the second angular extension include a substantially L-shaped rail.

15. The pointing device system of claim 1, further comprising a navigation sensor supported by the plurality of hollow rods and aligned with the sleeve, wherein the navigation sensor is configured to detect rotational movement of the sleeve in the first direction and translation of the sleeve in the second direction.

16. The pointing device system of claim 15, wherein the navigation sensor comprises an optical sensor configured to provide light to and detect reflected light from a surface of the sleeve.

17. The pointing device system of claim 16, further comprising a circuit board in communication with the navigation sensor, the circuit board configured to transmit data to a processor responsive to detected movement of the sleeve.

18. A pointing device system comprising:
a device housing;
a bracket assembly comprising:
an elongate base member;
a sleeve disposed surrounding the elongate base member, the sleeve configured to rotate about the elongate base member in a first direction and slide about the elongate base member in a second direction substantially orthogonal to the first direction;
a first support and a second support disposed at distal ends of the elongate base member having a plurality of hollow rods interposed therebetween, wherein the first support includes a first angular extension and the second support includes a second angular extension, the first and second angular extension configured to support depression of the bracket assembly relative to a base of the device housing;
at least one navigation sensor configured to detect rotation and translation of the sleeve; and
a circuit board disposed within the device housing, the circuit board in communication with the navigation sensor and configured to transmit data to a processor responsive to rotation and translation of the sleeve.

19. The pointing device system of claim 18, wherein the plurality of hollow rods are disposed substantially adjacent and spaced apart from an outer surface of the sleeve.

20. The pointing device system of claim 18, wherein the device housing further comprises a first pivot connected to the base of the device housing and a second pivot connected to the base of the device housing, the first pivot configured to receive the first angular extension and the second pivot configured to receive the second angular extension, wherein the first angular extension and the second angular extension are configured to pivot about the first and second pivot in response to a downward pressure being applied to the elongate base member relative to the base of the device housing.

21. The pointing device system of claim 20, further comprising at least one force adjuster interposed between the base of the device housing and the bracket assembly.

22. The pointing device system of claim 21, wherein the at least one force adjuster is located proximate an end of the elongate base member.

23. The pointing device system of claim 22, wherein the at least one force adjuster is configurable to adjust a downward pressure force of the elongate base member.

24. The pointing device system of claim 22, wherein the at least one force adjuster includes a leaf spring disposed proximate an end of the elongate base member.

25. The pointing device system of claim 18, further comprising at least a first support spring interposed between the base of the device housing and the first support.

26. The pointing device system of claim 18, further comprising a click trigger switch configured to activate and generate a click operation responsive to downward pressure being applied to the elongate base member.

27. The pointing device system of claim 18, further comprising at least one end sensor configured to detect translation of the sleeve beyond a predetermined location on the elongate base member in the second direction.

28. The pointing device system of claim 27, wherein the at least one end sensor is chosen from an optical sensor, a Hall Effect sensor, and a capacitive sensor.

29. The pointing device system of claim 18, wherein the first angular extension and the second angular extension include a substantially L-shaped rail.

30. The pointing device system of claim 18, wherein the navigation sensor comprises an optical sensor configured to provide light to and detect reflected light from a surface of the sleeve.

31. An apparatus, comprising:
an elongate base member;
a sleeve disposed to fit over a portion of the elongate base member, the sleeve configured to rotate about the elongate base member in a first direction and slide about the elongate base member in a second direction substantially orthogonal to the first direction;
a first support including a first angular extension configured to support depression of the elongate base member;
a second support including a second angular extension configured to support depression of the elongate base member; and
a plurality of hollow rods interposed between the first support and the second support.

32. The apparatus of claim 31, wherein the first support is disposed at a first end of the elongate base member and the second support is disposed at a second end of the elongate base member.

* * * * *

UNITED STATES PATENT AND TRADEMARK OFFICE
CERTIFICATE OF CORRECTION

PATENT NO. : 10,031,591 B2
APPLICATION NO. : 14/896800
DATED : July 24, 2018
INVENTOR(S) : Steven Wang et al.

Page 1 of 1

It is certified that error appears in the above-identified patent and that said Letters Patent is hereby corrected as shown below:

In the Specification

Column 7, Line 34 should read:
Furthermore, in various embodiments, the base member 302 may be depressible, permitting the user of the pointing device to perform one or more click operations (discussed below).

Column 11, Line 49 should read:
The Hall-effect sensor outputs a signal based on the proximity of an actuator to the sensor.

Signed and Sealed this
Sixteenth Day of October, 2018

Andrei Iancu
*Director of the United States Patent and Trademark Office*